May 30, 1967 W. B. BUCK 3,322,214
DRILLING METHOD AND APPARATUS
Filed Dec. 26, 1963 2 Sheets-Sheet 1

INVENTOR.
W. B. BUCK
BY
ATTORNEYS

May 30, 1967 W. B. BUCK 3,322,214
DRILLING METHOD AND APPARATUS
Filed Dec. 26, 1963 2 Sheets-Sheet 2

INVENTOR.
W. B. BUCK
BY
ATTORNEYS

United States Patent Office 3,322,214
Patented May 30, 1967

3,322,214
DRILLING METHOD AND APPARATUS
William B. Buck, Guymon, Okla., assignor to Phillips Petroleum Company, a corporation of Delaware
Filed Dec. 26, 1963, Ser. No. 333,305
5 Claims. (Cl. 175—66)

This invention relates to well drilling. In one aspect the invention relates to a method of drilling a bore hole which includes adding a particulate scouring agent to the drilling fluid. In another aspect, the invention relates to a drilling fluid composition comprising a particulate scouring agent. In another aspect the invention relates to well drilling means, including means to supply drilling fluid and means to add a particulate scouring agent to the fluid.

When drilling extremely hard, rock formations, a diamond-studded drill bit often is used. Although such a bit is costly, it wears slowly and gives long service without removal from the well so that such bits can compare economically with conventional rock bits. However, when drilling formations wherein extremely hard rock is interspersed with softer formations such as soft shale, the rate of drilling is reduced due to wedging between the protruding diamonds of particles of shale, which do not allow the diamonds to cut into the formation and drill effectively. Therefore, it often is necessary to replace a diamond bit with a conventional rock bit to penetrate the shale formations. When the layers are interspersed at short intervals, such a procedure is uneconomical.

An object of my invention is to increase the rate of drilling of soft formations with diamond bits.

Another object of my invention is to provide apparatus for drilling interspersed hard and soft formations effectively.

Another object of my invention is to provide an apparatus for supplying a particulate scouring agent to drilling fluid.

Other aspects, objects and the advantages of my invention are apparent in the written description, the drawing and the claims.

According to my invention, in drilling a bore hole wherein difficulties are encountered with an accumulation of soft material on the face of the bit, a particulate scouring agent is added to the drilling fluid to scour the bit face and prevent loss of drilling efficiency due to the accumulation. The invention can be practiced by withdrawing the drilling fluid from a storage zone and raising its pressure to that required to circulate the fluid through a well bore, applying the same pressure to a quantity of the scouring agent, and feeding the agent by gravity flow into the fluid under pressure, while regulating the flow of the particulate scouring agent to the desired amount.

Further, according to my invention, there is provided a drilling fluid composition comprising a mixture of a drilling fluid selected from the group consisting of aqueous base fluids, oil base fluids, and emulsion fluids, and a volume of a particulate scouring agent.

Further, according to my invention, there is provided means for well drilling comprising a drill pipe, means to rotate the pipe, a diamond bit attached to the bottom of the pipe, means to supply drilling fluid to the pipe, and means to add a particulate scouring agent to the fluid.

Preferably the amount of the scouring agent added to the drilling fluid is at least about 1 percent by volume of the total composition of the fluid. The upper limit of the amount of scouring agent is determined by economic considerations and practical considerations of pumpability of the drilling fluid.

Suitable scouring agents include solid particulate materials having sufficient resistance to crushing and abrasion to stand the trip down into the well without complete disintegration and to retain sufficient scouring action to clean the bit. A very satisfactory material is graded Ottawa sand. Other suitable materials include, for example, metal pellets such as aluminum pellets, and other relatively hard particulate materials such as rock particles, walnut shells, etc. The general class of materials suitable for use as fracture propping agents are suitable for this invention. A particularly good material comprises high strength glass beads, which have high crushing strength and are spherical in form and can be obtained in closely graded size.

Preferably, the scouring agent has particles in the range of 10 to 60 mesh. Mesh, as used in this application, means the Tyler standard screen scale sieves, as described on page 3402 of "Handbook of Chemistry and Physics," 43rd edition, 1961, Chemical Rubber Publishing Company, Cleveland.

In the drawing, FIGURE 1 is a schematic elevation, partly in cross-section, of well drilling equipment and a well bore.

Figure 1:
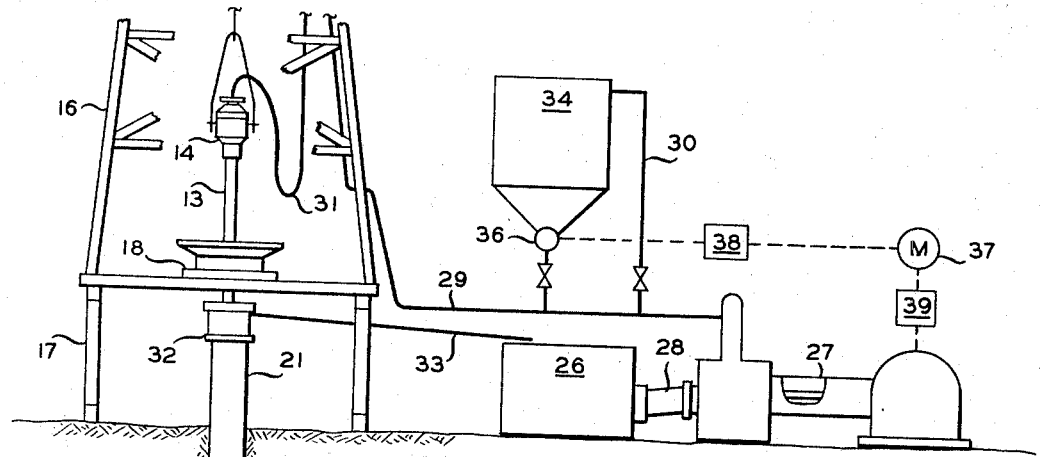

Referring to FIGURE 1, a drilling bit 11 is attached to the lower end of a string of drill pipe 12, which in turn is supported from a conventional kelly 13, and a swivel 14. A derrick 16 is supported on a sub-structure 17. At the floor of the derrick 16, there is provided a rotary table 18. Below the derrick the bore hole 19 extends into an underground formation and is partially cased with a conductor casing 21. The underground formation is composed of interspersed layers of hard rock 22 and soft shale 23.

A drilling fluid tank 26 is connected with a drilling mud pump 27 through a suction conduit 28. The high pressure outlet of pump 27 is connected through a pipe 29, a rotary hose 31, and swivel 14, with the drill string, including kelly 13, drill pipe 12 and bit 11. Means for returning the mud include a T 32 on the top of conductor casing 21, and a return line 33. A bin 34 is provided for the scouring agent, above pipe 29, and the flow into pipe 29 is controlled by a star valve 36. A pipe 30 connects pipe 29 to the upper portion of a bin 34. A motor 37 drives star valve 36 through a suitable power train indicated schematically by the numeral 38, and drives pump 27 through a second power train indicated schematically by the numeral 39.

Figure 2:
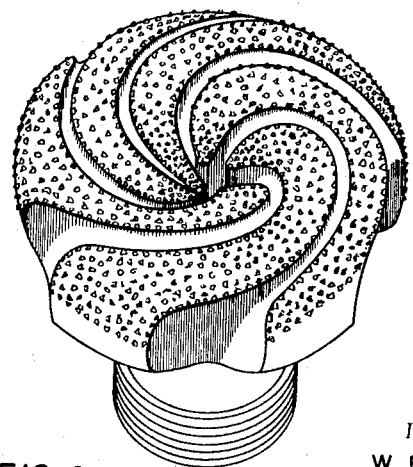
FIGURE 2 illustrates a typical diamond-studded drilling bit.

FIGURE 2 shows a typical diamond-studded drill bit suitable for use as bit 11.

In operation, the drill string is made up by attaching bit 11 to the lower end of drill pipe 12, which is made up in sections, and to which is added a kelly joint 13 when the desired length has been made. Kelly 13 is supported by swivel 14, the bail of which is supported by the usual hook, cable, traveling block and crown block supporting mechanism (parts of which are not shown) in derrick 16. Drilling fluid is pumped by pump 27 through conduit 29, rotary hose 31, swivel 14, kelly 13, drill pipe 12 and out through bit 11 as the drill pipe is rotated by rotary table 18.

Motor 37 drives pump 27 at a speed which is determined by the speed of motor 37 and the characteristics of the power train 39. When a soft formation such as soft shale 23 is entered and drilling rate is slowed by an accumulation of particles between the diamonds on the bit 11, the drive train 38 is engaged between motor 37 and star valve 36 to feed the particulate scouring agent at the desired rate into pipe 29. Since bin 34 is positioned above pipe 29 and since the pressure in the upper portion of bin 34 is equalized with the pressure in pipe 29 by means of pipe 30, the scouring agent flows by gravity into pipe 29 and does not enter the pump at this time.

The scouring agent, as it progresses through the fluid courses on the surface of the bit and across the face of the bit cleans away the particles which have accumulated there, permitting the diamonds of the bit to contact the formation for increased penetration rate. The returning drilling fluid flows through T 32 and return line 33 into a tank 26. Any desired amount of separation of the drilling fluid can be carried on to protect pump 27. For example, tank 26 can be provided with baffles (not shown) to encourage settling of the scouring agent from the drilling fluid. A vibrating screen type of shale shaker or other means for separating the agent from the fluid can be provided.

*Example*

Figure 3:
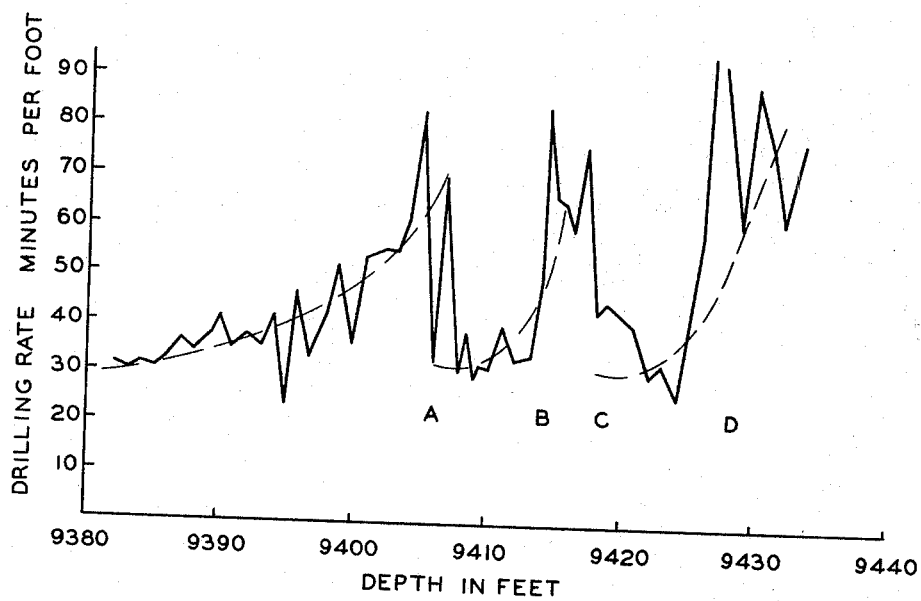
FIGURE 3 shows the increase in drilling rate when a scouring agent is added according to my invention.

A well was drilled on a lease in the State of Arkansas. At a depth of 9406 feet, when drilling with a diamond-studded drilling bit having spiral water courses as illustrated in FIGURE 2, when the drilling time per foot had increased from about 30 minutes to about 80 minutes, Ottawa sand of 40–60 mesh was introduced into the drilling fluid. With the fluid being circulated at 150 gallons per minute, 540 pounds of the sand were introduced. The mud was circulated before and after the sand injection at 150 gallons per minute. The chart in FIGURE 3 illustrates the reduction in drilling time per foot which occurred. This is the portion of the curve above the letter A.

When the drilling time again had increased to about 80 minutes per foot, another quantity of sand was injected. In this run, 60 pounds were injected in 6 minutes Again there was a reduction in drilling time which, however, was short-lived. This is illustrated in the portion of the curve above the letter B. When the drilling time again appeared to be rising, 1100 pounds of sand were introduced over a one hour period. Again, there was a reduction of drilling rate as illustrated in the portion of the curve above the letter C. A subsequent test when the drilling rate had increased to more than 140 minutes per foot, comprised an injection of 1200 pounds of 20–40 mesh sand. The run was terminated shortly thereafter after a reduction in drilling time was obtained but not to the level of the previous reductions. This is illustrated in the portion of the curve above the letter D.

Reasonable variation and modification are possible within the scope of my invention, which sets forth method and apparatus for well drilling, including means to drill with a diamond-studded bit and to maintain the bit free of accumulated cuttings.

I claim:
1. A method for drilling a bore hole which comprises: rotating a diamond bit in contact with the formation being penetrated to form said bore hole;
circulating drilling fluid through a drill pipe supporting said diamond bit and across the face of said bit;
determining the drilling rate; and
adding a particulate scouring agent to said drilling fluid when said drilling rate is slowed to an undesired value to scour said bit face and alleviate loss of drilling efficiency due to the accumulation of cuttings thereon.

2. In the method of drilling a bore hole wherein a diamond bit is rotated in contact with the formation to be penetrated and wherein drilling fluid is circulated through the drill pipe and across the face of the drilling bit, the improvement which comprises:
determining the drilling rate; and
adding a particulate scouring agent having particles in the range of 10 to 60 mesh to said drilling fluid when said drilling rate is slowed to an undesired value in an amount equal to at least about 1 percent by volume of the total drilling fluid composition to scour said bit face and prevent loss of drilling efficiency due to the accumulation of cuttings thereon.

3. The method for adding a scouring agent to drilling fluid, which comprises the steps of:
withdrawing said fluid from a storage zone therefor;
pumping said fluid to raise the pressure thereof to that required to circulate said fluid through a well bore;
applying said pressure to a quantity of said scouring agent;
feeding said agent by gravity flow into said fluid under pressure; and
regulating said flow and said pumping by driving a regulating means and pumping means from a common driver to correlate the flow of said scouring agent with the flow of said fluid.

4. Well drilling means comprising:
a drill pipe;
means to rotate said drill pipe;
a diamond bit attached to the bottom of said drill pipe;
a drilling fluid storage tank;
a drilling fluid pump communicating with said tank to raise the pressure of said fluid and deliver said fluid from said tank to said drill pipe;
a pressure conduit connecting said pump with said drill pipe;
a storage bin for a particulate scouring agent above said conduit;
an equalizing pipe connecting said fluid conduit with the upper portion of said bin to equalize the pressure therebetween;
feeding means to control the flow from said bin into said conduit; and
a common driving means for said pump and said feeding means.

5. A method for drilling a bore hole into an underground formation comprising alternate layers of hard rock and soft materials, which comprises the steps of:
lowering into said hole a drilling string comprising a diamond drilling bit;
rotating said bit against said formation to drill said hole;
circulating drilling fluid through said drill string and across the surface of said bit;
determining the drilling rate; and
adding a particulate scouring agent to said drilling fluid when said drilling rate is slowed to an undesired value to alleviate the reduction of drilling rate due to accumulation of said soft material on the face of said bit.

References Cited

UNITED STATES PATENTS

| | | | |
|---|---|---|---|
| 1,512,140 | 10/1924 | Schaub | 175—67 X |
| 1,931,845 | 10/1933 | Hart et al. | 175—380 X |
| 2,493,178 | 1/1950 | Williams | 175—329 |
| 2,626,779 | 1/1953 | Armentrout | 166—20 |
| 2,642,268 | 6/1953 | Armentrout | 175—72 |
| 2,648,522 | 8/1953 | Armentrout | 175—72 |
| 2,650,195 | 9/1953 | Cardwell | 175—72 |
| 2,749,092 | 6/1956 | Peter | 175—340 |
| 2,944,019 | 7/1960 | Thompson | 175—6 X |
| 3,111,179 | 11/1963 | Albers | 175—340 X |
| 3,175,629 | 3/1965 | Rowley | 175—329 |
| 3,215,215 | 11/1965 | Kellner | 175—330 |

CHARLES E. O'CONNELL, *Primary Examiner.*

R. E. FAVREAU, *Assistant Examiner.*